United States Patent [19]
Yingst et al.

[11] Patent Number: 5,117,476
[45] Date of Patent: May 26, 1992

[54] OPTICAL TRANSCEIVER PACKAGE WITH INSERTABLE SUBASSEMBLY

[75] Inventors: Stephen M. Yingst, Hummelstown; Robert C. Briggs, Newport; John F. D'Ambrosia, Harrisburg; Steven L. Flickinger, Hummelstown; Steven P. Owens, Grantville; Jeffrey A. Zeiders, Middletown, all of Pa.

[73] Assignee: AMP Incorporated, Harrisburg, Pa.

[21] Appl. No.: 480,702

[22] Filed: Feb. 15, 1990

Related U.S. Application Data

[63] Continuation-in-part of Ser. No. 467,825, Jan. 19, 1990, abandoned.

[51] Int. Cl.[5] ............................................. G02B 6/42
[52] U.S. Cl. ........................................ 385/88; 385/49; 385/92
[58] Field of Search ................ 350/96.2, 96.21, 96.15; 385/88, 92, 49

[56] References Cited

U.S. PATENT DOCUMENTS

| | | | |
|---|---|---|---|
| 4,979,787 | 12/1990 | Lichtenberger | 350/96.2 |
| 5,005,939 | 4/1991 | Arvanitakis et al. | 350/96.2 |
| 5,011,246 | 4/1991 | Corradetti et al. | 350/96.2 |

OTHER PUBLICATIONS

Sample, Transceiver 125 Mb/s, 1300 nm, PN 501712-1, Ser. 00623.
"Optimate Transceivers Application Note", Publication #4661-8, AMP Incorporated, Oct. 1989, Copyright 1988, 1989.
Customer drawing Nos. 101712 and 101713 dated Aug. 19, 1987.
Brochure, Optimate Fixed Shroud Duplex System, AMP Inc., 83263-15M-STR-2/88, Copyright 1988.

Primary Examiner—John D. Lee
Assistant Examiner—Stephen W. Barns

[57] ABSTRACT

A transceiver package (22) having a receptacle adapted to receive a connector (12) terminating a cable (18) having optical fibers; key element means (56) for being of varied width to fit a corresponding groove (13) of said connector (12) respective ports (70, 71) for mating with said connector (12); and functional parts of a transceiver including: a transmitter active device (191) and a receiver active device (190), integrated circuit substrate means (112), and posts (122, 124).

18 Claims, 5 Drawing Sheets

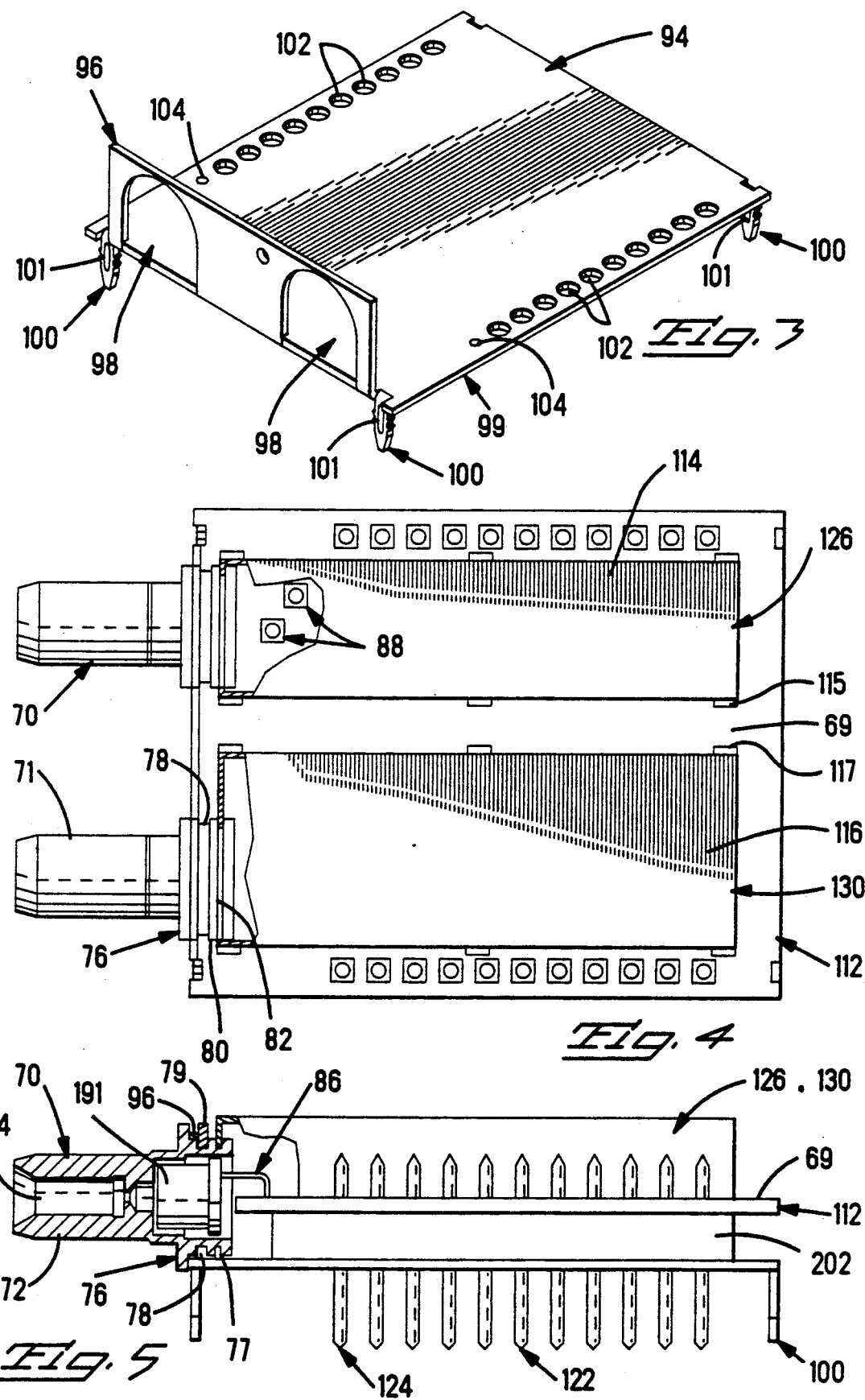

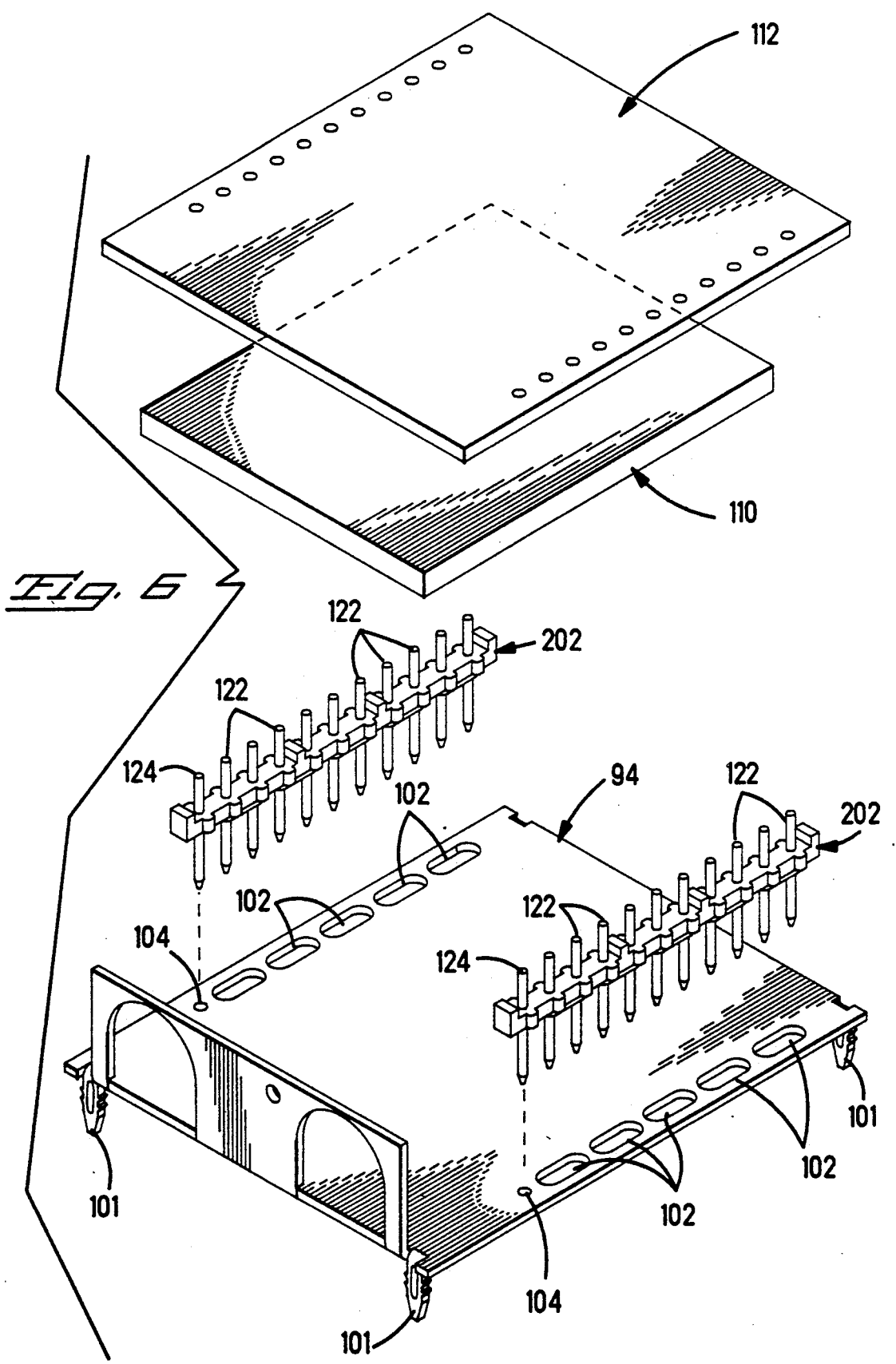

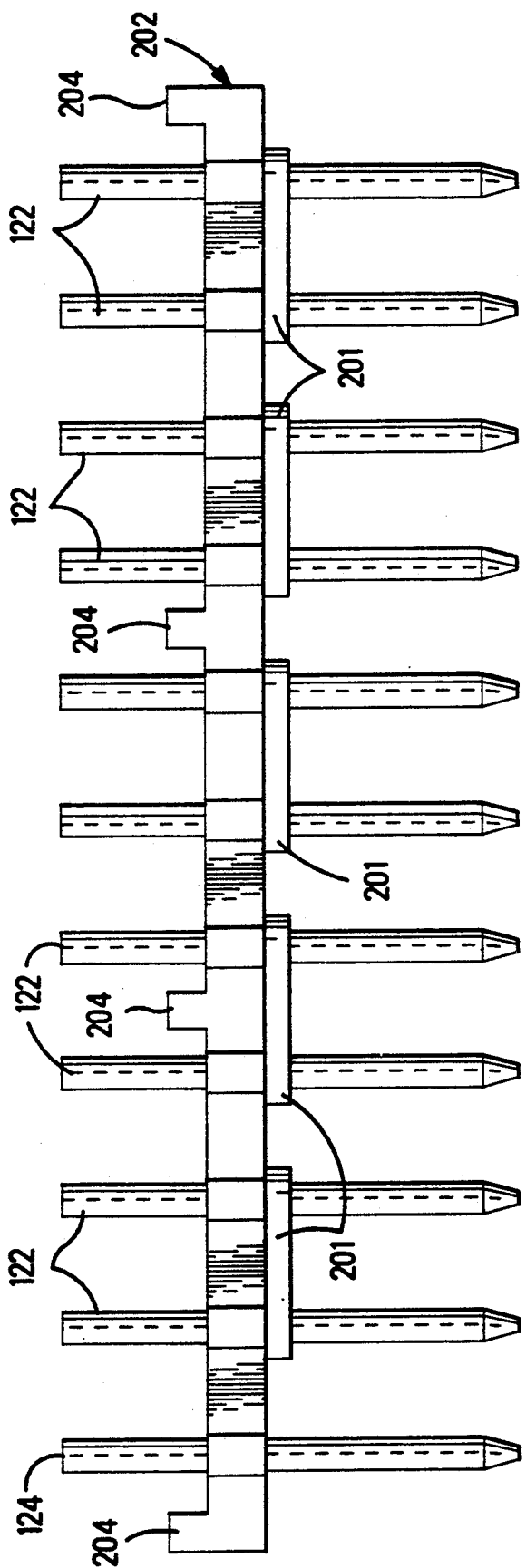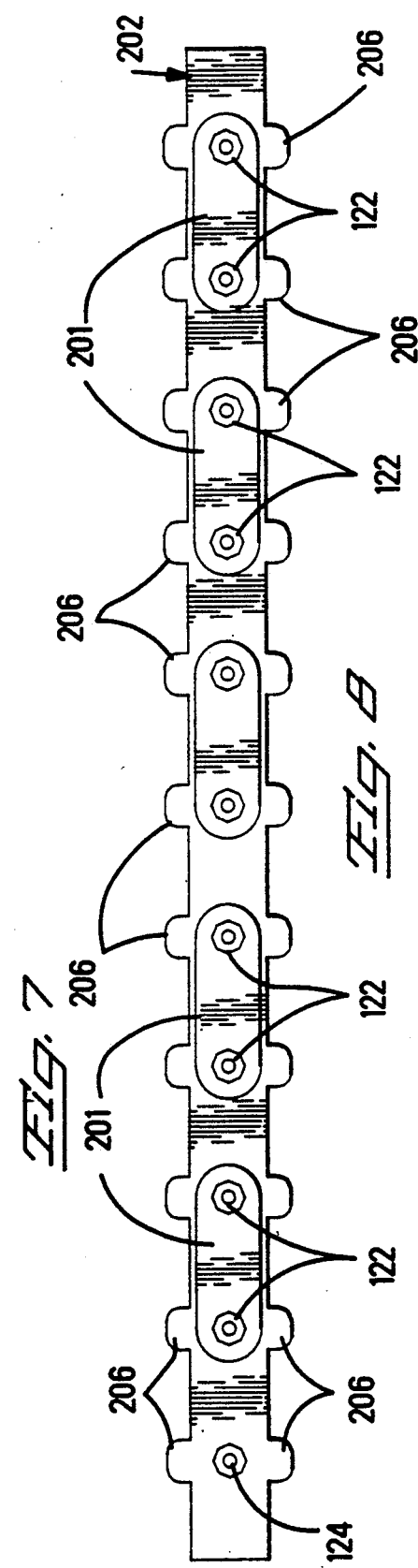

OPTICAL TRANSCEIVER PACKAGE WITH INSERTABLE SUBASSEMBLY

This application is a continuation in part of application Ser. No. 07/467,825, Filed Jan. 19, 1990, abandoned Mar. 13, 1991.

This invention relates to a transceiver package for connecting fiber optic cable to active components operable to transmit and receive optical and electrical signals, including a relationship of parts to manage thermal, grounding, shielding, and mechanical aspects of such device.

BACKGROUND OF THE INVENTION

A transceiver is a device which transmits and receives signals, and an optical transceiver accomplishes this function with respect to both optical and electrical signals. Typically, optical signals are received, converted into electrical signals which are then processed and/or utilized with appropriate response electrical signals converted into optical signals and transmitted on a separate optical path. Optical cable and connectors and optical devices of the high performance variety require mating between cable ends and active devices of great precision, particularly with respect to alignment and mating tolerances in assembly and use. The electronic circuits utilized to provide signal conversion and manipulation with respect to optical and electrical signals are typically integrated circuits mounted on boards or ceramic or other substrates of dielectric material which, at the frequency of use, generate considerable heat. As these devices function, they experience considerable expansion and contraction due to heat generation, particularly in the context of the minute tolerance demands of optical devices. Aside from thermal problems, shielding, electrical grounding, and mechanical protection require care in packaging including care in avoiding cross-coupling of signals into any structures which are utilized for shielding, grounding, and thermal transfer. Because of these diverse requirements, practice has generally separated the electrical and optical components into separate packages Aside from creating the need for lengthy signal transmission pathways, the practice has led to a relatively costly, bulky, and complicated packaging approach. This in turn has led to the need to do testing, alignment, and tuning in the field to get optical and electronic packages to work compatibly.

Accordingly, it is an object of the present invention to provide a low cost, compact optical/electronic package which integrates connector, optical, and integrated circuit components in a compatible manner. It is a further object to provide a transceiver package wherein assembly and use tolerances are accommodated as between optical and electronic structures. It is a further object of the invention to provide a transceiver package wherein the functional components can be assembled and tested as a sub-assembly and then readily assembled with a connector housing and package by a simple fitting together of parts. It is a final object of the invention to provide an electronic package wherein optical and electronic parts are fitted together in a package providing shielding, grounding, thermal management, and mechanical protection of such parts.

SUMMARY OF THE INVENTION

The present invention achieves the foregoing objectives by providing an outer plastic shell having at one end wall portions defining a connector receptacle adapted to receive a connector plug fitted therein and latched thereto. The shell includes a changeable keying feature and interiorly, a wall apertured to receive optical ports and adjacent such wall, interior surfaces adapted to receive in sliding engagement a sub-assembly containing the functional parts of a transceiver, both optical and electronic, with a cap portion fitted thereover to enclose the sub-assembly. The sub-assembly is comprised of a metal platform having an upstanding flange integrally formed therewith containing transmitter and receiver ports and positioning and fixing such ports along an alignment axis relative to the insertion of a plug connector within the receptacle portions of the shell. The platform further includes a base portion carrying a flexible plastic spacer having low dielectric material constant and good thermal transfer qualities. An integrated circuit substrate is carried on such spacer and includes contact posts oriented to be inserted along an axis transverse to the axis of alignment of the connector portions of the package. Metal boxes are fitted over the substrate for shielding purposes and details are provided in the port elements to accommodate the boxes in a mechanical and electrical connection. The base of the platform is made co-extensive with the integrated circuit substrate to provide heat dissipation, shielding, and the spacer is sufficient to preclude cross-coupling of signals within the substrate and the platform. The substrate and platform are joined through the connection of the active devices in the ports carried by the flange of the platform as well as a pair of posts connected to the substrate and joined to the base of the platform. The remaining posts of the substrate pass through the plane of the substrate and are isolated mechanically, thermally, and electrically therefrom. This interconnection facilitates the slight movements caused by the differential and thermal expansion and contraction of the metal of the platform and the ceramic of the substrate. The platform is further provided with feet or legs, preferably containing features allowing the package to be plugged into a further circuit board. The sub-assembly of ports, substrate platform can be handled, tested, and inventoried as a separate unit with final assembly into the shell a matter of sliding the assembly in place and attaching the cap of the assembly to such shell.

BRIEF DESCRIPTION OF THE DRAWINGS

FIG. 3 is a perspective showing the platform structure of the invention.

FIG. 4 is a plan view of the sub-assembly of the invention.

FIG. 5 is an elevational view of the sub-assembly of the invention showing, in partial section, details of an optical port and their relationship to shielding boxes and the platform.

FIG. 6 is a perspective view of a platform and headers with parts shown exploded apart.

FIG. 7 is a side elevation view of a header shown in FIG. 6.

FIG. 8 is a bottom plan view of a header shown in FIG. 7.

DETAILED DESCRIPTION OF THE INVENTION

Figure 1:
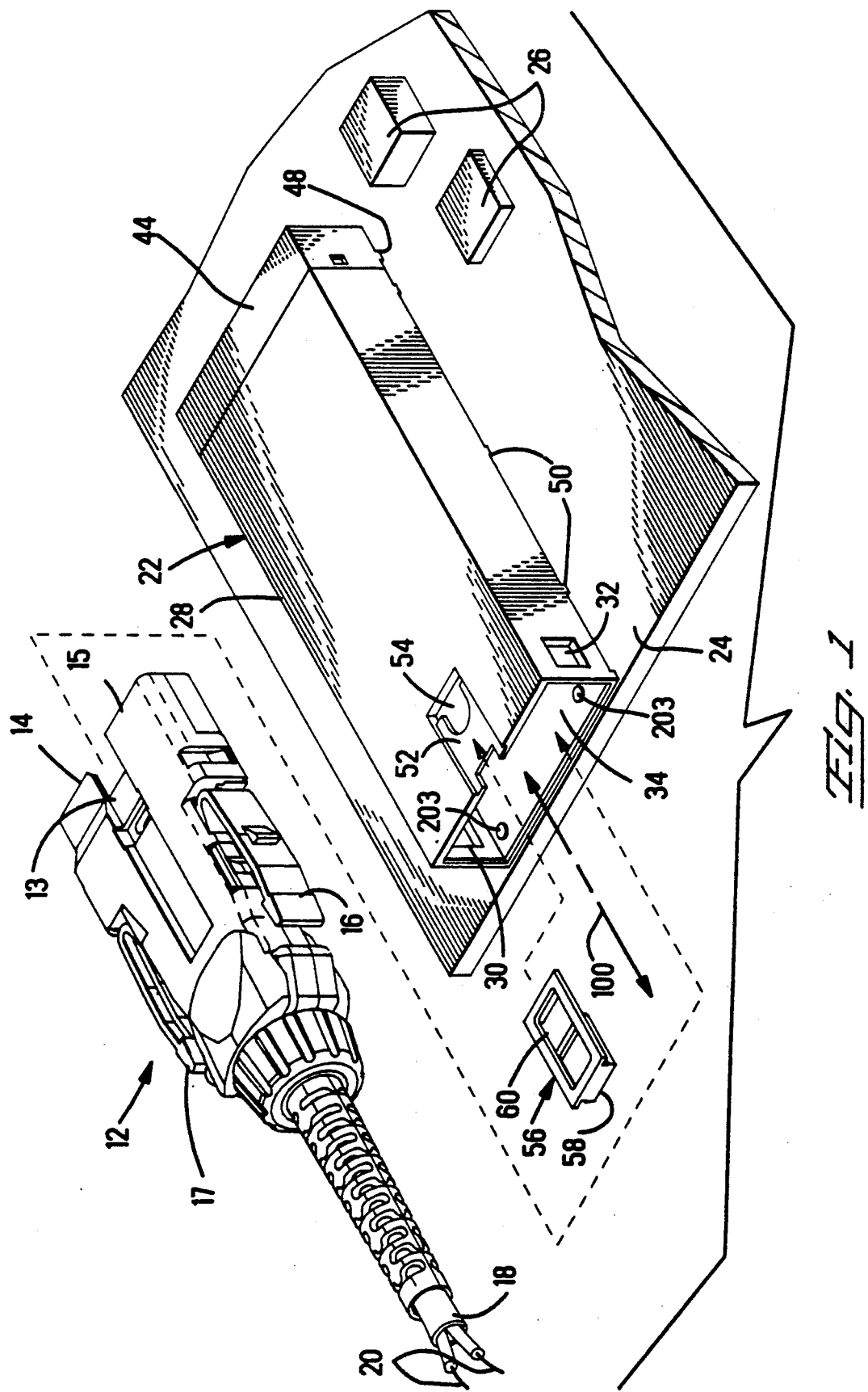
FIG. 1 is a perspective showing the package of the invention mounted on a circuit board preparatory to receiving a mating plug.

Referring now to FIG. 1, an assembly is shown which includes a plug connector 12 preparatory to being inserted in a receptacle formed at the end of a transceiver modular package 22 which is in turn mounted mechanically and electrically on a circuit board 24. The elements 26 are representative of further components mounted on such board and the board 24 may be taken to contain circuit pathways and circuit components like 26 driven by electrical signals generated within 22 to in turn generate further signals operated on by circuits within 22. The plug connector 12 includes a housing 14 carrying integrally formed therewith a pair of latches 16 and 17 and as can be seen, the connector half 12 terminates a cable 18 which, in the illustrative embodiment, carries a pair of optical cables 18, 20. These cables are typically arranged to carry signals transmitted to the unit 22 and transmitted from such unit. Reference is hereby made to U.S. application Ser. No. 112188 filed Oct. 26, 1987 now abandoned which details a plug connector half like 12, including the latching features and the function of the connector 12.

Figure 2:
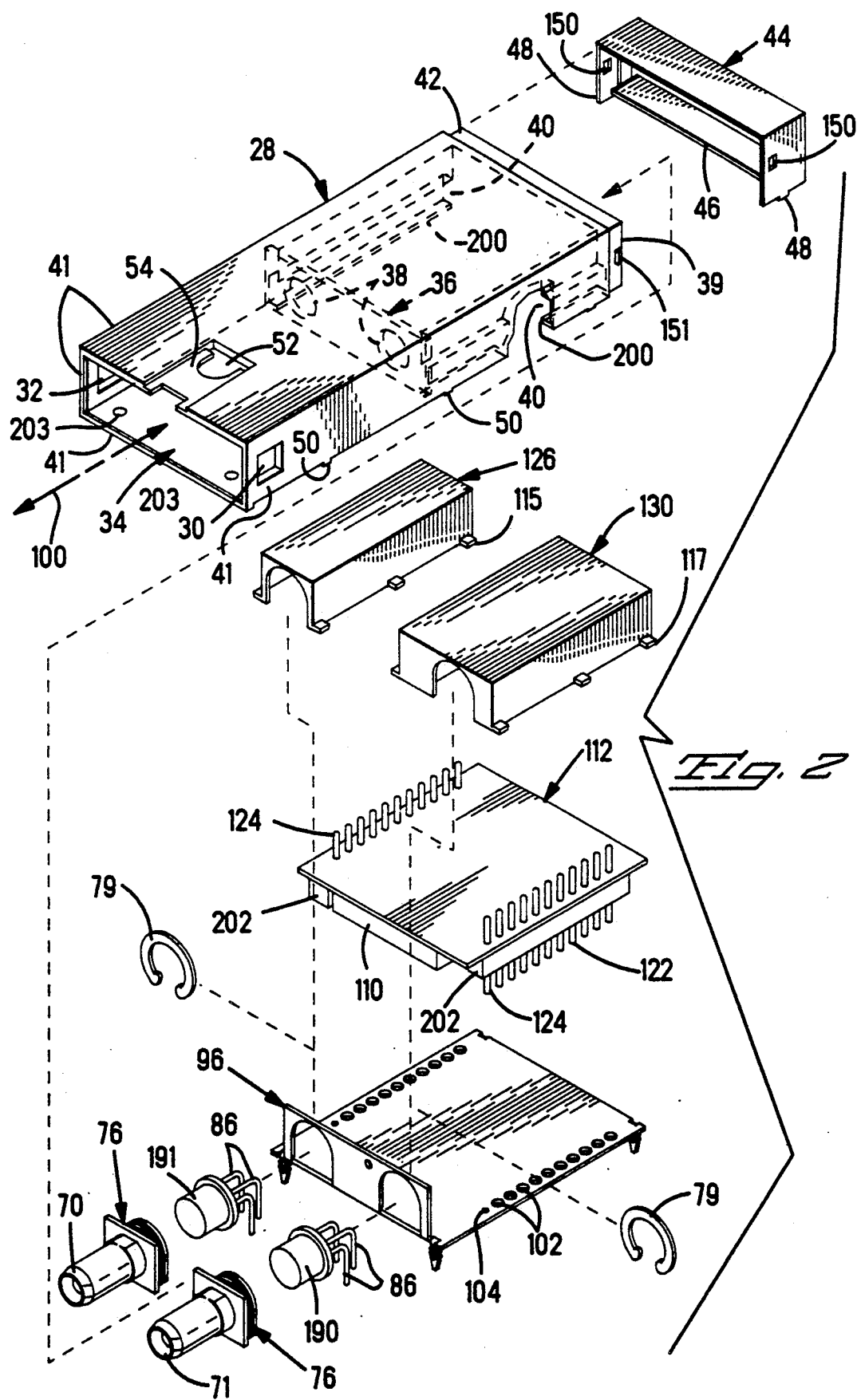
FIG. 2 is a perspective exploded of the package of the invention showing shell details in phantom and the various relationship of parts of the sub-assembly.

The transceiver module 22 includes, an outer shell 28 typically molded of engineering plastic to include the details shown in FIG. 2. An outer shell 28 has a box-like configuration with apertures 30 and 32 at one end arranged to receive and engage the latches 16 and 17 of the plug 12. Interior of shell 28 is an aperture 34 into which the forward plug portion 14 is inserted. Interiorly of the shell is a wall 36 which contains a pair of apertures 38 through which are fitted optical ports 70, 71 in the form of active device mounts to be described hereinafter. The end opposite aperture 34 is open as at 39 to receive a sub-assembly 69 to be described and interiorly of the shell walls are slots 40 or grooves on either side of the shell which receive in sliding engagement the outside edges of the sub-assembly slidingly engaged therealong. Shell 28 ends in a flange shown as 42 shaped to receive an end cap 44 having an interior wall slotted as at 46. The endcap 44 further includes a pair of projections shown as 48 which serve as standoffs for the package as mounted on board 24. The shell 28 includes forwardly a further pair of standoffs 50, the several standoffs allowing the package to be mounted on board 44 with a clearance therebeneath for cleaning following soldering operations. The arrow 100 shown in FIG. 2 indicates the axis of insertion and of axial alignment for intermating of optical connectors 12 as well as the axis of insertion and withdrawal of the sub-assembly 69.

In the top center portion of shell 28, as shown in FIGS. 1 and 2, is a keying structure including a relieved slot 52 transverse to the axis of insertion and grooves 54 thereadjacent aligned to receive the outer edge surfaces of a key element 56 which is made to have a projection 58 and a relief 60 allowing such element to be inserted and snapped into place within the surfaces defined by 52 and 54 of the shell. The projection 58 can be varied in width or made to contain alternative geometries so as to fit into a groove carried in a structure on the top of plug half 12, such groove being shown as 13 fitted into portion 15 of the leading end of 12. By varying these keying structures, plug and receptacle halves may be matched to an appropriate function.

Also shown in FIG. 2 is a sub-assembly 69 which can be seen is free-standing and is made into a functional device for the purpose of testing manufacture, inventory, and the like. The sub-assembly 69 includes a platform shown as 94 in FIG. 3, a spacer shown as 110 in FIG. 5, and an integrated circuit board or ceramic substrate shown as 112 in the several FIGS. 2–5. A plurality of posts 122 interconnect the circuit substrate 112 to further circuits in board 24 when plugged therein. The sub-assembly 69 further includes a pair of ports 70 and 71 extending through a flange 96 formed from the platform 94 and optionally, metallic shielding boxes 126 and 130 positioned as shown in FIGS. 2, 4 and 5.

Referring now to FIGS. 4 and 5, the sub-assembly 69 includes a pair of ports 70 and 71 which are active device mounts which contain optical transmitter and receiver active device 190, 191 fixed therewithin as indicated in FIG. 5 with respect to port 70. Each of the ports 70, 71 includes a beveled front end 72 adapted to guide in mating relationship a connector half 12 which is extended within the bore into a mating engagement of the surface of the optical active device 190, 191 contained within 70, 71. Each port 70, 71 includes a front flange 76, generally rectangular in shape, positioned to serve as a stop relative to axial insertion of a port 70, 71 through the apertures 98 in the flange 96 of the platform (see FIG. 3). Each of the ports 70, 71 includes a D-shaped section shown as 77 fitted within t wall or aperture 98 of 96 to orient the port and fix it against rotation relative to the flange 96, the platform 94, and the circuit substrate 112. Adjacent this flange is a groove shown as 78 having fitted therein a C-clip which locks the port to the flange. The clip is shown as 79 and thereadjacent is further flange 80 and a groove 82 in the port material adapted to receive the wall material of a shielding box, a pair of boxes 126 and 130 covering circuit areas 114 and 116 as shown in FIG. 4. Leads, shown as 86, extend from the active device 190, 191 within a port 70, 71 to be joined as by soldering to pads the surface of the substrate 112. These leads interconnect the transmitter and receiver active devices 190, 191 within the two ports 170, 171. With respect to the sub-assembly 69 shown in FIG. 4, the upper port 70 is connected electrically to a receiver component mounted on the surface of 112. The transmitter elements of the transceiver are similarly interconnected to the active device 190 within port 71.

A variety of leads shown as 88 in FIG. 4 connect the various active components to rows of posts 122 extended along the edges of the substrate 112.

Platform 94 which is preferably formed of thin metal stock stamped into the configuration shown in FIG. 3 with the upstanding flange 96 having a pair of apertures 98 to receive the ports 70 and 71. The flange 96 is integrally joined with a base portion 99 extending in area to be co-extensive width and slightly wider than the circuit substrate 112 to define outer edges which slide in the grooves 40 of the shell 28 in a manner heretofore described Base 99 further includes at the corners formed down legs shown as 100, each including apertures 101 which make the legs 100 deformable so as to be compressed and retain the platform 94 in relation to holes in board 24 thus securing the transceiver package 22 in such board 24 initially and prior to soldering the posts 122, 124 of the sub-assembly 69 to the board 24. The legs 100 are made to have a cross-sectional area to facilitate conductive heat transfer from the platform 94 to grounding circuits within board 24. These legs 100 can also serve to effect an electrical ground carrying off any voltages induced in the platform 94 and tying the platform 94 to an appropriate voltage level to serve as a ground plane. The platform 94 is made to include a series of apertures or holes 102 along the two sides adapted to accommodate the posts 122 extended therethrough without touching the metallic portions of the platform 94. A pair of reduced diameter holes or apertures 104 are provided in the platform 94 as shown in FIG. 3 adapted to receive posts such as 124 as shown in FIGS. 4 and 5, which posts 124 are terminated as by soldering to the platform 94 and which may be terminated to ground paths in board 24 and to ground circuits within the substrate 112. This serves to tie a ground commonly and electrically from the ground plane within the substrate 112 to the platform 94 and to ground planes in 24.

Resting on the upper surface of the platform is a spacer shown as 110. The spacer 110 extends co-extensively with the substrate 112; the platform 94, spacer 110, and substrate 112 sandwiched together as indicated together in FIG. 5. The spacer 110 is preferably made of a low dielectric material which has good thermal characteristics. The material is plastic and flexible so as to conform the surfaces of the substrate 110 and platform 94 and is of a thickness to preclude minute induced voltages from being cross-coupled between the platform 94 and the substrate 110. As mentioned previously, metal boxes 126 and 130 are fitted over the active device components at 114 and 116 on substrate 112 and are bonded thereto by pads shown as 115 and 117 and are, as mentioned, joined to the material of the ports 70 and 71 through an engagement with the grooves 82 thereof. Along the outside edges of the sub-assembly 69 are an array of posts as mentioned shown as 122 which are joined to the circuits of the substrate 112 and which pass freely through the apertures 104 of the platform 94 to extend beneath the sub-assembly 69 in the manner shown in FIG. 5. Electrical signals are generated by the components of the substrate responsive to optical inputs through port 70 pass through the various posts 122 to connect the circuits of the substrate 112 and thus the optical devices and the signals generated thereby and received thereby to the board 24, its circuits and components Similarly, signals processed by 24 pass through posts 122 to substitute circuits and via the active device 190 in 71 to be transmitted.

It is to be observed that the substrate 112, space 110, posts 122, 124, boxes 126, 130 and there may be in alternative embodiments, additional components, all stack in a vertical sense relative to the sub-assembly 69; i.e., along the axis shown the arrow in FIGS. 2 and 5. This axis is at right angles to the axis of alignment of the ports 170, 171 and the insertion of the plug half of the connector 12 carrying mating optical connector halves. It is further pointed out that the interconnection, mechanical and electrical, between the integrated circuit substrate 112, which may typically be ceramic, having a given thermal coefficient, and the platform 94 formed of metal having a substantially different coefficient, is made through the flexible spacer 110, the pair of posts 124, and the leads 86 to the active optical devices 190, 191. Due to the span between metal parts provided by the spacer 110 and the length of leads 86, thermal expansions of the metal parts may differ from the expansions of the ceramic parts. It is contemplated that the substrate 112 may be of a variety of constructions, including the typical printed circuit board laminar construction or in certain instances, with different sorts of electronic components made of glass or a variety of plastics. In an actual embodiment, the platform 94 was made of phosphor bronze on the order of 0.025 inches in thickness. The port 70, 71 structures were made of 303 stainless steel and the shell was made of a polyester PBT.

With reference to FIG. 6, an illustrated platform 94 is substantially the same as disclosed in conjunction with FIG. 3, except for the following structure. The apertures 102 extending through the thickness of the platform 94 are elongated along the length of a corresponding header 202 to accommodate two posts 122 in each aperture 102.

The corresponding header 202 is an assembly of an insulative strip and multiple conductive posts 122 projecting through the strip for connection to circuit components of an circuit board. Insulative material of the corresponding header 202 is injection molded with the posts 122 such that the posts 122 are held in positions by the solidified material of the header 202. The corresponding header 202 is substantially the same as disclosed in conjunction with FIGS. 1-5, except for the following structure. Unitary bosses 201 of the header 202 project outwardly toward the platform 94 and are assembled together with the corresponding posts 122 in corresponding apertures 102. The thickness of the platform 94 encircles the posts, and the header 202 extends between the thickness of the platform 94 and each of the posts 122, to reduce inductive coupling between the platform 94, that may carry eddy currents and is at one electrical potential, and each of the posts 122, that carry fractional amperage electrical current at their own desired, fixed electrical voltage. The header 202, especially the projecting bosses 201 of the header 202, extends in corresponding apertures 102 to interlock the strip and the platform. The header 202 includes unitary insulative columns 204 spaced along the length of the strip 202 and supporting an underside of the circuit board 112 to provide a clearance space between the lengthy surface of the strip 202 and the circuit board 112 to facilitate solder flow and cleaning when the circuit board 112 is joined by solder to the posts 122 and 124. As in FIGS. 1-5, the spacer 110 provides a heat sink in between and in engagement with the platform 94 and the circuit board 112 such as a ceramic substrate, and the platform 94 supports the strip 202 which in turn supports the circuit board 1!2, and legs 101 are unitary with the platform 94 and project outward of the thickness of the platform 94 and extend in the same direction as the posts 122 and 124. A series of unitary projections 206 are distributed along the length of the header 202 and are within the thickness plane of the header 202 to prevent warpage of the header 202 during solidification after molding.

We claim:

1. A transceiver package, comprising:
a shell; a receptacle of the shell adapted for receiving a connector terminating a cable having optical fibers; the shell having an opening; a subassembly of functional parts of a transceiver including: a platform, integrated circuit substrate means supported by the platform, an optical transmitter active device and an optical receiver active device on said integrated circuit substrate means, and conductive post means on said integrated circuit substrate means connected to circuits of said integrated circuit substrate means; said subassembly being adapted for insertion in said opening; and the conductive post means extending from said integrated circuit substrate means and from the shell.

2. A transceiver package as recited in claim 1 wherein groove means in the shell extend toward said opening for receiving therein edges of the platform.

3. A transceiver package as recited in claim 1 wherein, the shell has unitary walls surrounding the receptacle and the opening.

4. A transceiver package as recited in claim 1, and further including: respective ports aligned with the transmitter active device and the receiver active device, the respective ports being included in said subassembly and being adapted for insertion in said opening, and the respective ports being adapted for mating with a connector terminating a cable having optical fibers.

5. A transceiver package as recited in claim 1, and further including: metallic shielding means connected to said integrated circuit substrate means for covering the transmitter active device and the receiver active device, the metallic shielding means being included in said subassembly, and being adapted for insertion in said opening together with said transmitter active device and with said receiver active device.

6. A transceiver package as recited in claim 1 wherein, said platform is conductive, and selected conductive post means connect to ground circuits of said integrated circuit substrate means and connect to said platform.

7. A transceiver package as recited in claim 1, and further including: a spacer between said integrated circuit substrate means and said platform, said platform is conductive, and selected conductive post means connect to ground circuits of said integrated circuit substrate means and connected to said platform.

8. A transceiver package as recited in claim 1 wherein said platform includes multiple openings, and some of said conductive post means extend through the openings without touching said platform.

9. A transceiver package as recited in claim 1, and further including: respective ports aligned with the transmitter active device and the receiver active device, the respective ports being adapted for mating with a connector terminating a cable having optical fibers, and a portion of said platform receiving the respective ports.

10. A transceiver package as recited in claim 1, and further including: metallic shielding means connected to said integrated circuit substrate means for covering the transmitter active device and the receiver active device, respective ports aligned with the transmitter active device and the receiver active device, the respective ports being adapted for mating with a connector terminating a cable having optical fibers, a portion of said platform receiving the respective ports, and said metallic shielding means being connected to the respective ports.

11. A transceiver package, comprising:
a shell having a connector receiving receptacle and a subassembly receiving opening; and
a subassembly including: a platform, integrated circuit substrate means, first conductive post means connected to circuits of said integrated circuit substrate means, second conductive post means for connecting ground circuits of said integrated circuit substrate means to the platform, an optical transmitter active device and an optical receiver active device on said integrated circuit substrate means, and respective ports aligned with the transmitter active device and the receiver active device;
said opening receiving said subassembly within said shell with said first and second conductive post means projecting out of said shell; and
said respective ports being positioned within said shell for mating with a connector terminating a cable having optical fibers.

12. A transceiver package as recited in claim 11, and further comprising: legs of the platform, and said opening receiving said subassembly with said legs extending out of the shell.

13. A transceiver package as recited in claim 11, and further comprising: flange means on the platform, and the respective ports being fitted to the flange means.

14. A transceiver package as recited in claim 11, and further comprising: metallic shielding means for covering the transmitter active device and the receiver active device, said metallic shielding means being adapted for insertion in said opening together with said subassembly.

15. A transceiver package as recited in claim 11, and further comprising: a flange of the platform having openings, the respective ports being received in the openings and fixed therein against rotation relative to the flange.

16. A transceiver package as recited in claim 1, 2, 3, 4, 5, 6, 7, 8, 9, 10, 11, 12, 13, 14, or 15, and further comprising: a changeable keying feature including; receiving means in the shell for receiving key element means, and key element means for insertion into place with said receiving means, and for being of a width varied to fit a groove of a connector terminating a cable having optical fibers.

17. A transceiver package, comprising: a shell having a receptacle adapted to receive a connector terminating a cable having optical fibers; a changeable keying feature having receiving means in the shell for receiving key element means, and key element means for insertion into place with said receiving means, and for being of a width varied to fit a groove of a connector terminating a cable having optical fibers; respective ports in the shell for mating with said connector; and functional parts of a transceiver including: an optical transmitter active device and an optical receiver active device in the shell aligned with the respective ports, integrated circuit substrate means in the shell, the transmitter active device and the receiver active device being connected to said integrated circuit substrate means, first post means for connection to circuits of said integrated circuit substrate means, and second post means for connection to ground circuits of said integrated circuit substrate means.

18. A package adapted to receive a connector terminating a cable having optical fibers, comprising: a shell having a receptacle, a changeable keying feature comprising receiving means in the shell for receiving key element means, and key element means for insertion into place with said receiving means, and for being of a width varied to fit a groove of a connector terminating a cable having optical fibers, and respective ports in the shell for mating with said connector, when the groove of the connector receives the key element means to allow receipt of said connector in the receptacle.

* * * * *